United States Patent
Ozcan et al.

(10) Patent No.: US 11,270,195 B2
(45) Date of Patent: Mar. 8, 2022

(54) NEUROMORPHIC COMPUTING IN DYNAMIC RANDOM ACCESS MEMORY

(71) Applicant: INTERNATIONAL BUSINESS MACHINES CORPORATION, Armonk, NY (US)

(72) Inventors: Ahmet S. Ozcan, Los Altos, CA (US); Daniel Waddington, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 521 days.

(21) Appl. No.: 16/293,230

(22) Filed: Mar. 5, 2019

(65) Prior Publication Data
US 2020/0285945 A1 Sep. 10, 2020

(51) Int. Cl.
*G06N 3/04* (2006.01)
*G06N 3/06* (2006.01)
*G06N 3/063* (2006.01)

(52) U.S. Cl.
CPC .............. *G06N 3/063* (2013.01); *G06N 3/04* (2013.01)

(58) Field of Classification Search
CPC ...... G06N 3/04; G06N 3/063; G06F 12/0223; G06F 12/04
See application file for complete search history.

(56) References Cited

U.S. PATENT DOCUMENTS

| | | | |
|---|---|---|---|
| 7,978,510 B2 | 7/2011 | Modha et al. | |
| 8,675,391 B2 | 3/2014 | Snider | |
| 8,892,487 B2 | 11/2014 | Chang et al. | |
| 8,990,133 B1 | 3/2015 | Ponulak et al. | |
| 9,256,823 B2 | 2/2016 | Sinyavskiy et al. | |
| 9,589,623 B2 | 3/2017 | Perner et al. | |
| 9,672,464 B2 | 6/2017 | Sarah et al. | |
| 9,904,874 B2 | 2/2018 | Shoaib et al. | |
| 10,002,658 B1* | 6/2018 | Hokenmaier | G11C 7/1006 |
| 2005/0030807 A1* | 2/2005 | Perner | G11C 11/40611 365/222 |
| 2019/0005376 A1* | 1/2019 | Akin | G06N 3/063 |

OTHER PUBLICATIONS

Chen et al., "DaDianNao: A Machine-Learning Supercomputer", 2014 47th Annual IEEE/ACM International Symposium on Microarchitecture, Dec. 2014, 14 pages.
Gokmen et al., "Acceleration of Deep Neural Network Training with Resistive Cross-Point Devices: Design Considerations", Frontiers in Neuroscience, Jul. 2016, pp. 1-13.

* cited by examiner

*Primary Examiner* — Hal Schnee
(74) *Attorney, Agent, or Firm* — Tutunjian & Bitetto, P.C.; Randall Bluestone

(57) ABSTRACT

A computer-implemented method is provided for neuromorphic computing in a Dynamic Random Access Memory (DRAM). The method includes representing one or more neurons by memory rows in the DRAM. Each bit in any of the memory rows represents a single synapse. The method further includes responsive to activating a given one of the neurons, reinforcing an associated synaptic state of a corresponding one of the memory rows representing the given one of the neurons. The method also includes responsive to inhibiting the given one of the neurons, degrading the associated synaptic state of the corresponding one of the memory rows representing the given one of the neurons.

19 Claims, 9 Drawing Sheets

NEUROMORPHIC COMPUTING IN DYNAMIC RANDOM ACCESS MEMORY

BACKGROUND

Technical Field

The present invention generally relates to memory device, and more particularly to neuromorphic computing in a Dynamic Random Access Memory (DRAM).

Description of the Related Art

The biggest difference between conventional von Neumann versus brain-inspired neuromorphic computing is the organization of memory and processing. In brains, neurons and synapses are the fundamental elements of both computing and memory. However conventional computers have central processing units separated from the memory. Therefore, conventional computing platforms have an inherent mismatch for neuromorphic applications which affect performance.

Custom designed neuromorphic hardware tries to address this problem. However, such hardware is not flexible while being costly to design, manufacture and scale. Hence, there is a need for improved neuromorphic computing in memory.

SUMMARY

According to an aspect of the present invention, a computer-implemented method is provided for neuromorphic computing in a Dynamic Random Access Memory (DRAM). The method includes representing one or more neurons by memory rows in the DRAM. Each bit in any of the memory rows represents a single synapse. The method further includes responsive to activating a given one of the neurons, reinforcing an associated synaptic state of a corresponding one of the memory rows representing the given one of the neurons. The method also includes responsive to inhibiting the given one of the neurons, degrading the associated synaptic state of the corresponding one of the memory rows representing the given one of the neurons.

According to another aspect of the present invention, a computer program product is provided for neuromorphic computing in a Dynamic Random Access Memory (DRAM). The computer program product includes a non-transitory computer readable storage medium having program instructions embodied therewith. The program instructions are executable by a computer having the DRAM to cause the computer to perform a method. The method includes representing one or more neurons by memory rows in the DRAM, wherein each bit in any of the memory rows represents a single synapse. The method further includes responsive to activating a given one of the neurons, reinforcing an associated synaptic state of a corresponding one of the memory rows representing the given one of the neurons. The method also includes responsive to inhibiting the given one of the neurons, degrading the associated synaptic state of the corresponding one of the memory rows representing the given one of the neurons.

According to yet another aspect of the present invention, a computer processing system is provided for neuromorphic computing in a Dynamic Random Access Memory (DRAM). The computer processing system includes a memory for storing program code. The computer processing system further includes at least one hardware processor for running the program code to represent one or more neurons by memory rows in the DRAM. Each bit in any of the memory rows represents a single synapse. The processor further runs the program code to, responsive to activating a given one of the neurons, reinforce an associated synaptic state of a corresponding one of the memory rows representing the given one of the neurons. The processor also runs the program code to, responsive to inhibiting the given one of the neurons, degrade the associated synaptic state of the corresponding one of the memory rows representing the given one of the neurons.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to neuromorphic computing in a Dynamic Random Access Memory (DRAM).

The present invention addresses the aforementioned and other problems of the prior art by using commodity DRAM with minor modification and off-loading certain neural processing to the memory itself.

In an embodiment, the present invention provides a method of using existing Dynamic Random Access Memory (DRAM) hardware as the basis for neuromorphic computing (i.e., mimicking neuro-biological architectures) in the context of a conventional (von Neumann) computer system. Specifically, the embodiment exploits the inherent decay properties of DRAM memory cells (which typically need refreshing every 50-100 ms) together with the DRAM's row/column architecture to emulate and scale natural properties of the brain. The invention uses memory "rows" to represent neurons where each bit within the row represents a single synapse. When a neuron fires, the memory row is evaluated and as a consequence associated synaptic states are reinforced. Synaptic state in neurons that do not fire is degraded over time. Together, these two conditions are the basis of learning. The key benefit of the approach is to improve performance by effectively "off-loading" functionality that would normally be performed in software by a general purpose CPU. This benefit is particularly important for scaling emulated memories to billions of neurons. The present invention requires only a minor change to existing hardware, that is, to disable auto-refresh that is normally performed by circuits in the memory controller or memory chip itself.

Connections between neurons are maintained in software using conventional memory and/or storage.

Figure 1:
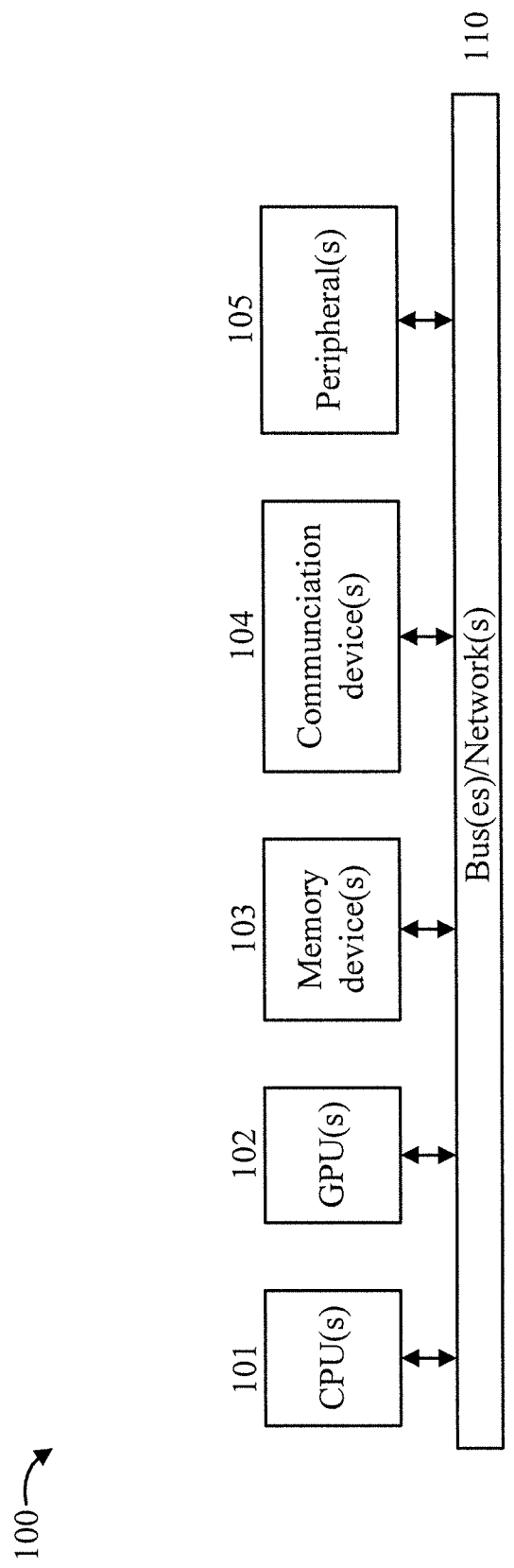
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
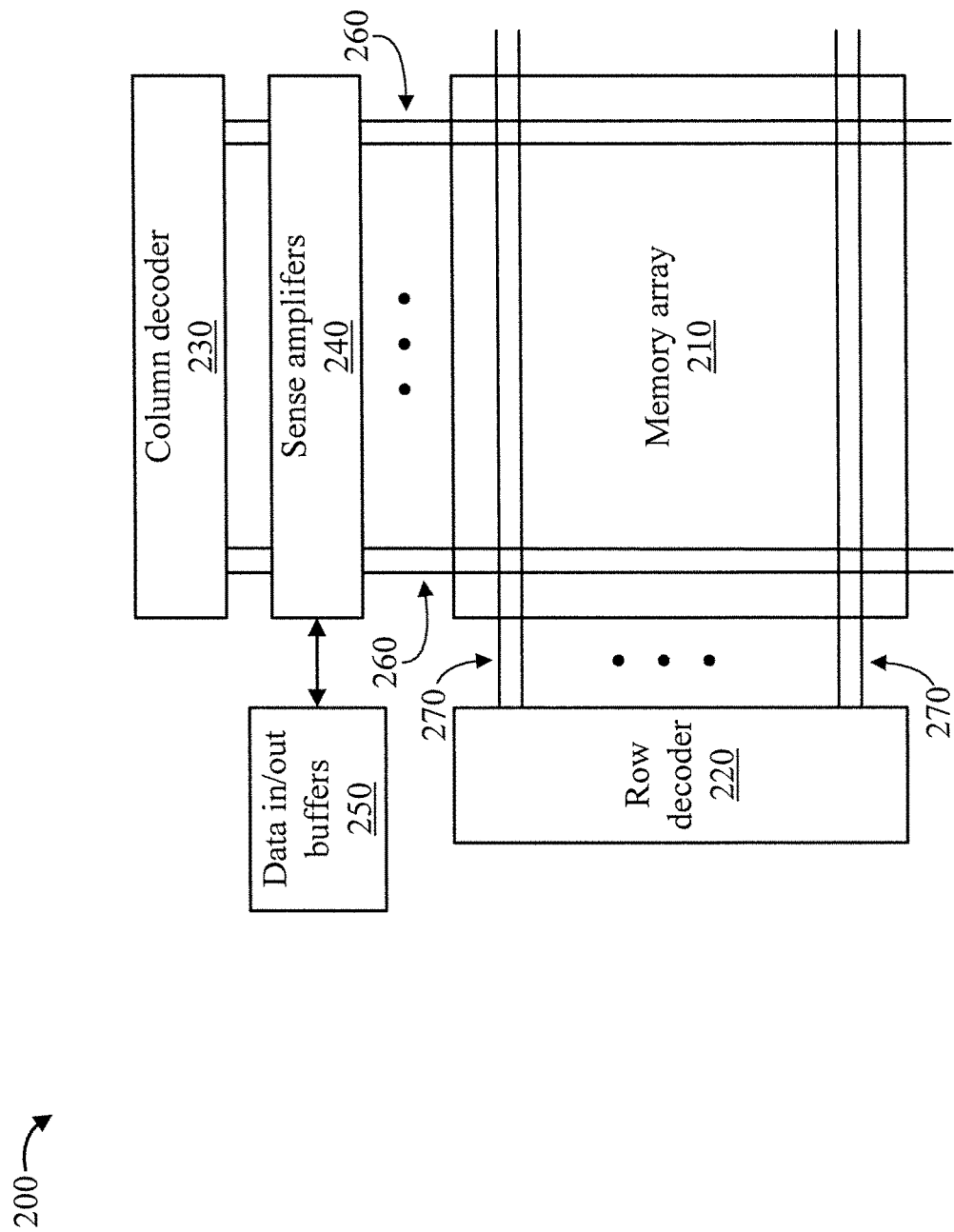
FIG. 2 is a block diagram showing an exemplary DRAM circuit to which the present invention can be applied, in accordance with an embodiment of the present invention.

FIG. 2 is a block diagram showing an exemplary DRAM circuit 200 to which the present invention can be applied, in accordance with an embodiment of the present invention.

The DRAM circuit 200 includes a memory array 210, a row decoder 220, a column decoder 230, sense amplifiers 240, data in/out buffers 250, (vertically disposed) bit lines 260, and (horizontally disposed) word lines 270. In an embodiment, the sense amplifiers 240 are implemented by a pair of cross-connected inverters.

Figure 3:
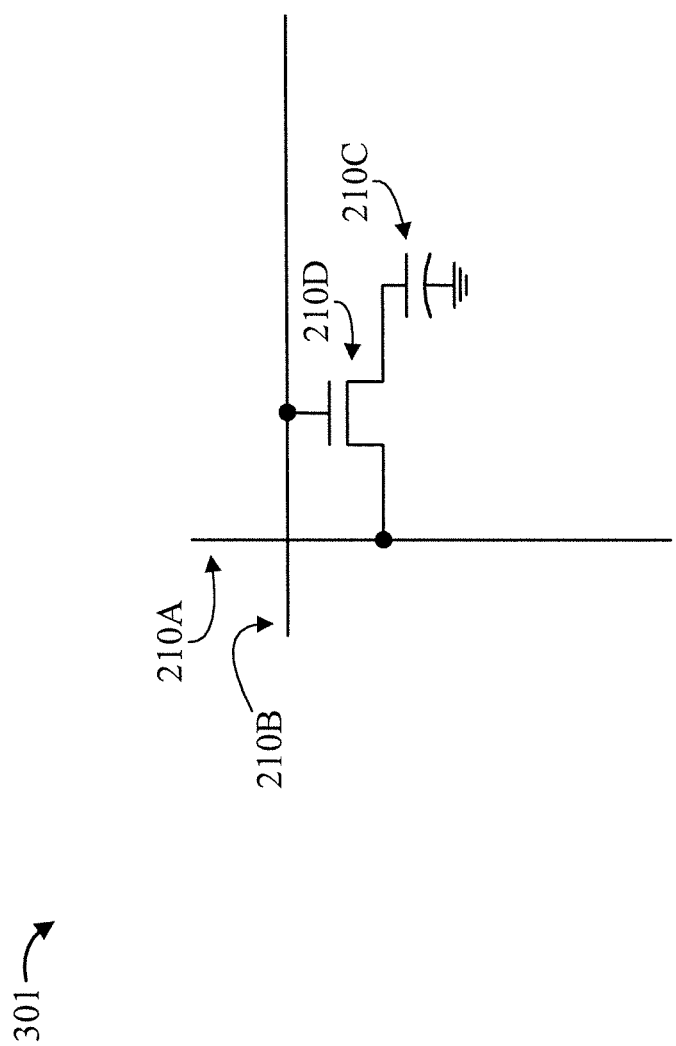
FIG. 3 is a block diagram further showing a memory cell of the memory array of FIG. 2, in accordance with an embodiment of the present invention.

FIG. 3 is a block diagram further showing a memory cell 301 of the memory array 210 of FIG. 2, in accordance with an embodiment of the present invention.

The memory cell 301 of the memory array 210 includes bit lines 210A, word lines 210B, a storage element 210C (e.g., a capacitor), and a switching element 210D (e.g., a transistor, a MOSFET, etc.).

Figure 4:
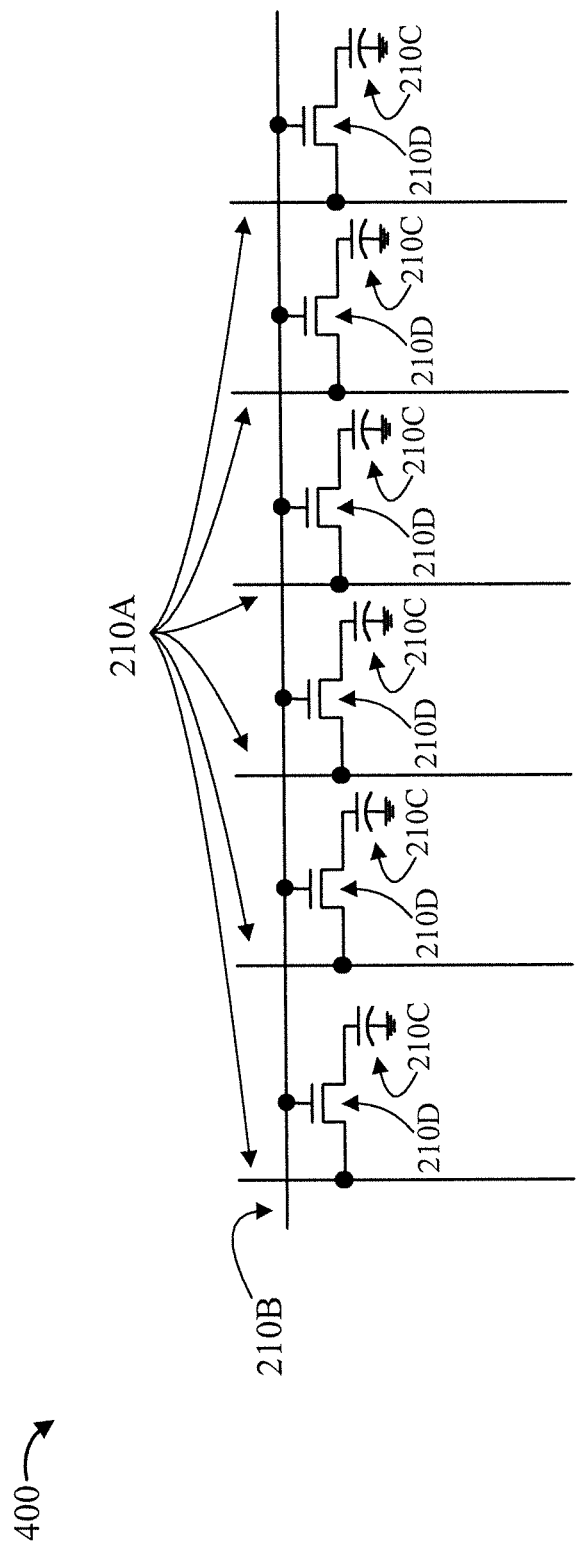
FIG. 4 is a block diagram further showing a row of the memory array of FIG. 2, in accordance with an embodiment of the present invention.

FIG. 4 is a block diagram further showing a row 400 of the memory array 210 of FIG. 2, in accordance with an embodiment of the present invention.

The row 400 includes and/or otherwise involves bit lines 210A, a word line 210B, storage elements 210C, and switching elements 210D.

In particular, each bit is stored in a given storage element 210C using a respective one of the switching elements 210D.

Figure 5:
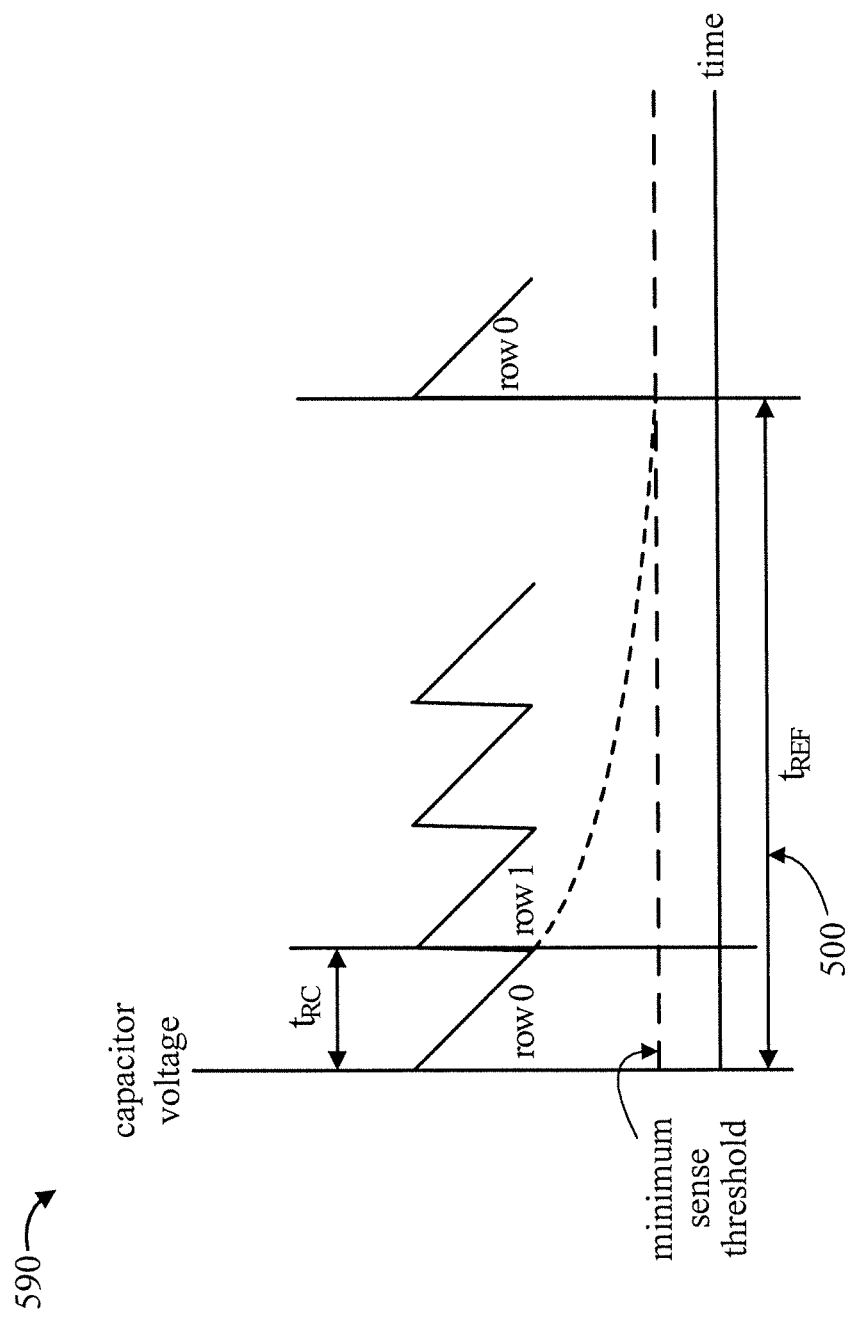
FIG. 5 is a timing diagram showing a refresh period for DRAM cells to which the present invention can be applied, in accordance with an embodiment of the present invention.

FIG. 5 is a timing diagram showing a refresh period 500 for DRAM cells to which the present invention can be applied, in accordance with an embodiment of the present invention.

The refresh period 500 is shown in a plot where the x-axis denotes capacitor voltage (relative to a fixed minimum sense threshold 590), the y-axis denotes time, $t_{RC}$ denotes a random read or write cycle time, and $t_{ref}$ denotes the refresh period.

Figure 6:
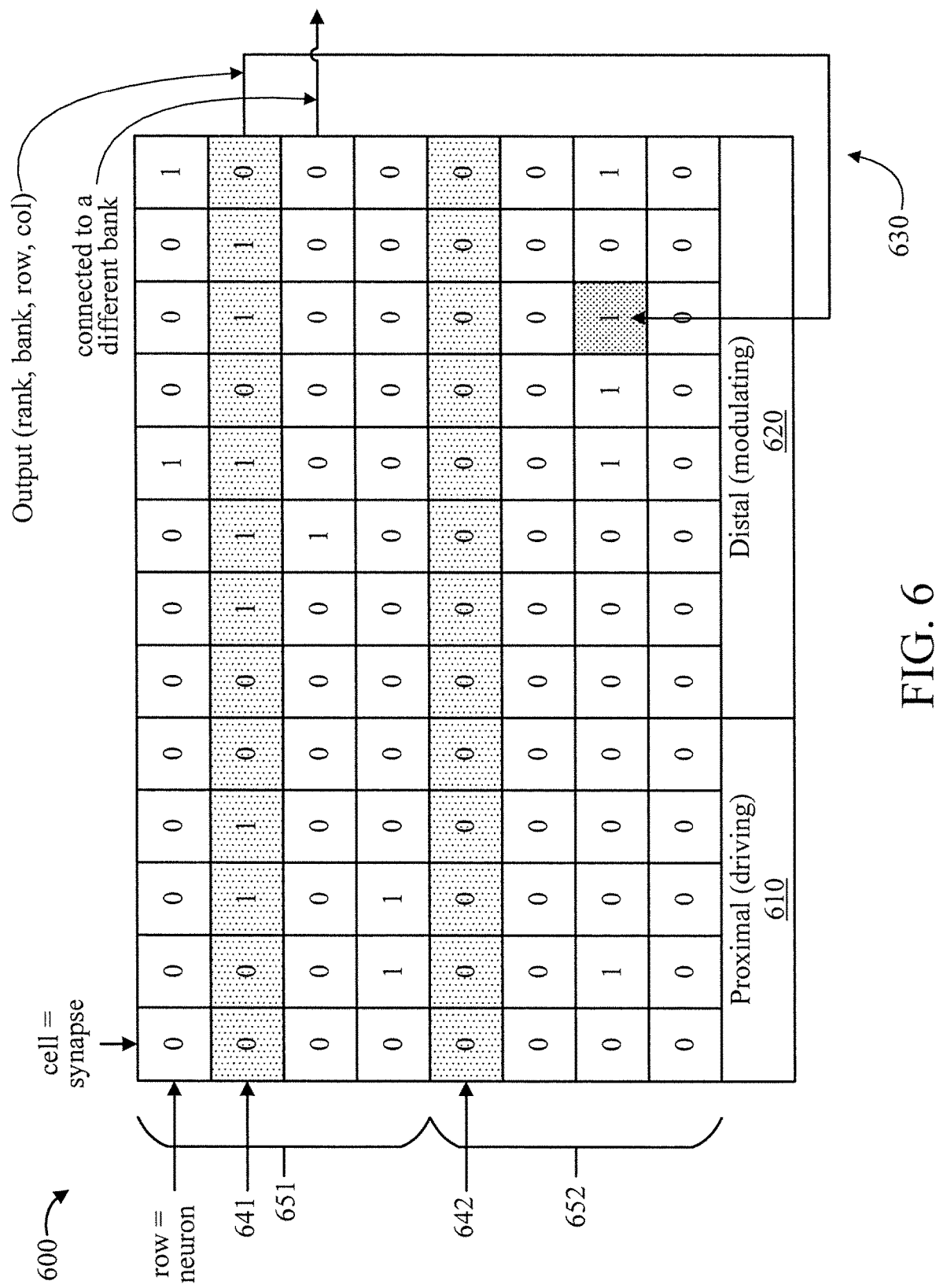
FIG. 6 is a block diagram showing an exemplary DRAM array representative of neural activity in a region, in accordance with an embodiment of the present invention.

FIG. 6 is a block diagram showing an exemplary DRAM array 600 representative of neural activity in a region, in accordance with an embodiment of the present invention.

Each cell, denoted by a box with a 0 bit or a 1 bit, in the array 600 represents a synapse. Each row represents a neuron. The array 600 is divided into proximal or driving cells 610, and distal or modulating cells 620.

Connections are mapped 630 through software. Active neurons 641 and 642 are shown relative to column 1 651 and column 2 652.

The axon inputs are provided via the bit lines and can be and/or otherwise involve, for example, writing a "1". The output can include the following tuple (rank, bank, row, col). In FIG. 6, an active neuron 641 is connected to a different bank.

Figure 7:
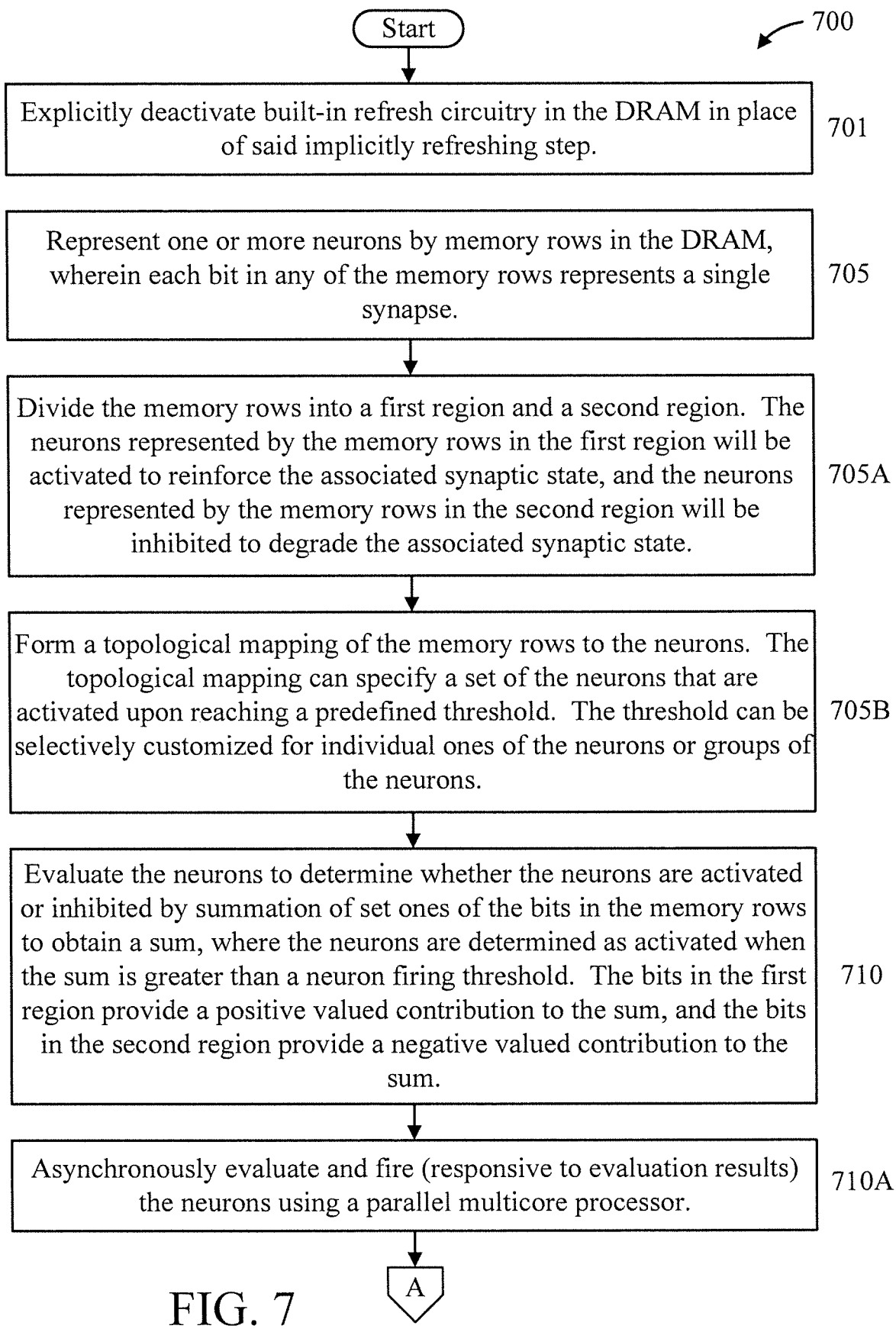
FIGS. 7-9 are flow diagrams showing an exemplary method for neuromorphic computing in a Dynamic Random Access Memory (DRAM), in accordance with an embodiment of the present invention.
Figure 8:
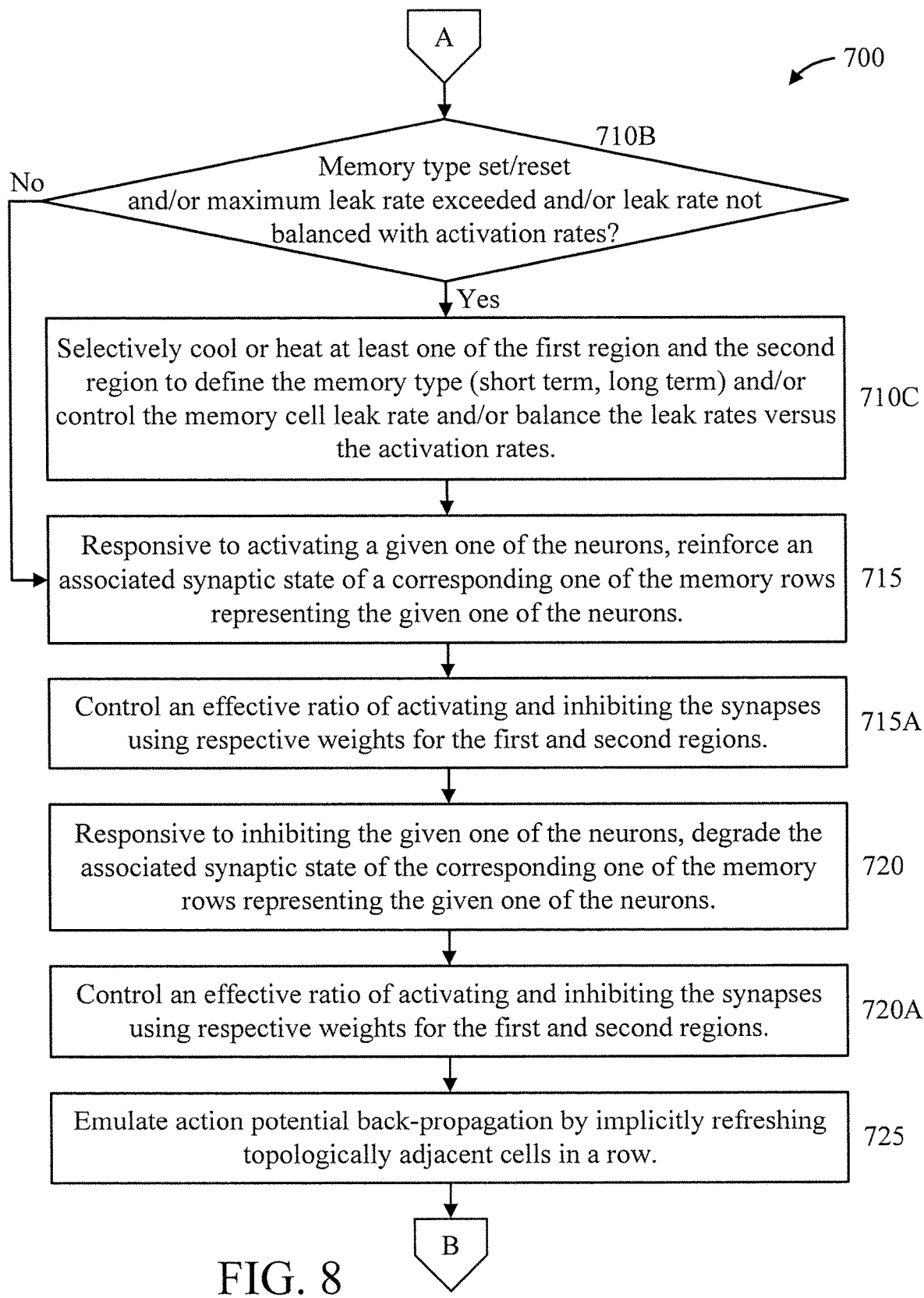
Figure 9:
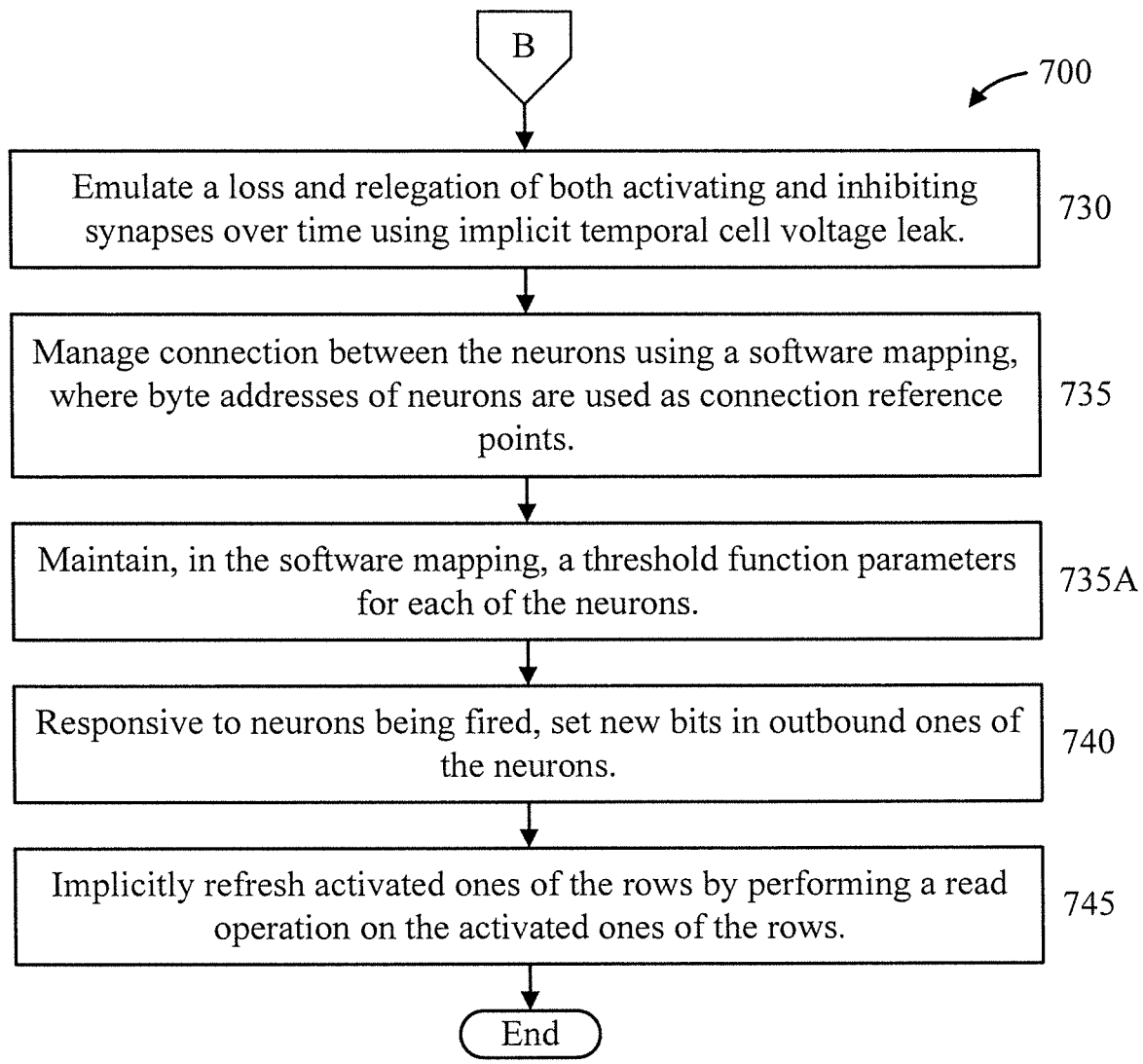

FIGS. 7-9 are flow diagrams showing an exemplary method 700 for neuromorphic computing in a Dynamic Random Access Memory (DRAM), in accordance with an embodiment of the present invention.

At block 701, explicitly deactivate built-in refresh circuitry in the DRAM in place of said implicitly refreshing step.

At block 705, represent one or more neurons by memory rows in the DRAM, wherein each bit in any of the memory rows represents a single synapse.

In an embodiment, block 705 includes one or more of blocks 705A through 705B.

At block 705A, divide the memory rows into a first region and a second region. The neurons represented by the memory rows in the first region will be activated to reinforce the associated synaptic state, and the neurons represented by the memory rows in the second region will be inhibited to degrade the associated synaptic state.

At block 705B, form a topological mapping of the memory rows to the neurons. The topological mapping can specify a set of the neurons that are activated upon reaching a predefined threshold. The threshold can be selectively customized for individual ones of the neurons or groups of the neurons.

At block 710, evaluate the neurons to determine whether the neurons are activated or inhibited by summation of set ones of the bits in the memory rows to obtain a sum, where the neurons are determined as activated when the sum is greater than a neuron firing threshold. The bits in the first region provide a positive valued contribution to the sum, and the bits in the second region provide a negative valued contribution to the sum.

In an embodiment, block 710 can include one or more of blocks 710A through 710C.

At block 710A, asynchronously evaluate and fire (responsive to evaluation results) the neurons using a parallel multicore processor.

At block 710B, determine whether (i) a memory type has been set/reset and/or (ii) a maximum memory leak rate has been exceeded and/or (iii) a leak rates are not balanced with activation rates. If so (for any of them), then proceed to block 710C. Otherwise, proceed to block 715.

At block 710C, selectively cool or heat at least one of the first region and the second region to (i) define the memory type (short term, long term) and/or (ii) control the memory cell leak rate and/or (iii) balance the leak rates versus the activation rates.

At block 715, responsive to activating a given one of the neurons, reinforce an associated synaptic state of a corresponding one of the memory rows representing the given one of the neurons.

In an embodiment, block 715 can include block 715A.

At block 715A, control an effective ratio of activating and inhibiting the synapses using respective weights for the first and second regions.

At block 720, responsive to inhibiting the given one of the neurons, degrade the associated synaptic state of the corresponding one of the memory rows representing the given one of the neurons.

In an embodiment, block 720 can include block 720A.

At block 720A, control an effective ratio of activating and inhibiting the synapses using respective weights for the first and second regions.

At block 725, emulate action potential back-propagation by implicitly refreshing topologically adjacent cells in a row.

At block 730, emulate a loss and relegation of both activating and inhibiting synapses over time using implicit temporal cell voltage leak.

At block 735, manage connection between the neurons using a software mapping, where byte addresses of neurons are used as connection reference points.

In an embodiment, block 735 can include block 735A.

At block 735A, maintain, in the software mapping, a threshold function parameters for each of the neurons.

At block 740, responsive to neurons being fired, set new bits in outbound ones of the neurons.

At block 745, implicitly refresh activated ones of the rows by performing a read operation on the activated ones of the rows.

A description will now be given regarding various aspects of the present invention, in accordance with an embodiment of the present invention.

In an embodiment, the present invention uses existing DRAM (Dynamic RAM) hardware technology to efficiently emulate brain-inspired memories. The approach improves performance and scaling by leveraging topological and dynamic characteristics of existing CMOS-based DRAM chips.

The present invention advantageously uses a single or groups of DRAM memory cells (e.g., row) to emulate individual neural synapses. Row-bits can be divided into two regions: one region representing a driving (activating) synapse; and the other region representing a modulating (inhibiting) synapse.

In an embodiment, the present invention can provide a topological mapping of DRAM rows to neurons that can be fired upon reaching some defined threshold of active synapses that represent the bit count of the row. Neurons (rows) are evaluated for "firing" by summation of set (+ve charge) synapse bits (i.e., evaluation of a threshold function). The bits in the modulating regions are considered negative in the summation/threshold evaluation. A threshold function may also use weightings for different regions so that the effective ratio of driving and modulating synapses can be controlled. A threshold function can be selectively customized for individual neurons or groups of neurons.

In an embodiment, an implicit temporal cell voltage leak is used to emulate the natural "loss" and relegation of both driving and modulating synapses over time.

A conventional software mapping (e.g., tree-based index, etc.) can be used to manage connections between neurons (i.e., axon-dendrite). The conventional byte addresses of neurons can be used as connection reference points. As neurons (rows) are evaluated and fired, new bits are set in outbound (axon connected) neurons. Neurons that receive synapse activation are in turn evaluated and so forth. Such a software mapping also allows for the dynamic growth of connections. This map also maintains threshold function parameters for each neuron.

A representative embodiment can use parallel multicore processors to asynchronously evaluate and fire neurons. Evaluation and firings can be realized as highly-parallel tasks that can be implemented with language-level concurrency and/or stack swapping techniques (e.g., Open MP, etc.).

In an embodiment, active rows (neurons) can be implicitly refreshed/recharged by performing a read operation on the row.

In an embodiment, conventional DRAM refresh circuitry (e.g., auto-refresh) is explicitly deactivated to ensure that cells/neurons are refreshed only through explicit reading/writing of their state. Memory cells that are not accessed eventually (in the order of seconds) will decay to no voltage (i.e., a 0 bit).

In an embodiment, implicit refresh of topologically adjacent cells in a row is used to emulate action potential back-propagation.

In an embodiment, the use of "targeted" memory cell region heating or cooling (e.g., using a liquid) to control the leak rate of cells (increasing heat, increases leak rate and thus reduces retention time). In an embodiment, a coarse grained leak-rate control provides the ability to both balance leak rates with compute/activation rates and to define different types of memory (e.g., short-term, long-term). Heating/cooling elements can be controllable through software. Heating/cooling elements can be located proximate to individual cells or regions (sets) of cells, depending upon the implementation. Various pumps and other equipment, as readily appreciated by one of ordinary skill in the art, can be utilized in order to provide liquid cooling to individual cells or regions of cells.

In an embodiment, learning is Hebbian: neurons that fire together wire together. Only the predicted neurons (rows) will be activated which will allow cells to be written. If a pre-synaptic neuron is not active, then a post-synaptic neuron will not be able to affect its state and vice versa.

In an embodiment, synaptic connections and strengths can be stored in a separate memory. This memory can also be subjected to implicit decay which effectively weakens connections.

In an embodiment, retention characteristics of DRAM arrays (memory banks) will be mapped and fingerprints will be stored. The random behavior (with respect to decay) of memory cells is exploited as a source of randomness in the learning system.

In an embodiment, synaptic connections can be represented in multiple bits instead of individually. This would reduce the available total number of synapses. However, averaging over multiple bits would benefit stability, as it will average the retention time.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for neuromorphic computing in a Dynamic Random Access Memory (DRAM), comprising:
representing one or more neurons by memory rows in the DRAM, wherein each bit in any of the memory rows represents a single synapse;
dividing the memory rows into a first region and a second region;
evaluating the neurons to determine whether the neurons are activated or inhibited by summation of set ones of the bits in the memory rows to obtain a sum, wherein the bits in the first region provide a positive valued contribution to the sum, and the bits in the second region provide a negative valued contribution to the sum;
responsive to activating a given one of the neurons, reinforcing an associated synaptic state of a corresponding one of the memory rows representing the given one of the neurons; and
responsive to inhibiting the given one of the neurons, degrading the associated synaptic state of the corresponding one of the memory rows representing the given one of the neurons.

2. The computer-implemented method of claim 1, wherein the neurons represented by the memory rows in the first region are activated to reinforce the associated synaptic state, and the neurons represented by the memory rows in the second region are inhibited to degrade the associated synaptic state.

3. The computer-implemented method of claim 2, wherein the neurons are determined as activated when the sum is greater than a neuron firing threshold.

4. The computer-implemented method of claim 3, further comprising asynchronously evaluating and firing the neurons using a parallel multicore processor.

5. The computer-implemented method of claim 2, further comprising selectively cooling or heating different ones of the regions to control cell leak rate.

6. The computer-implemented method of claim 2, further comprising selectively cooling or heating at least one of the first region and the second region to define different memory types selected from the group consisting of short term memory and long term memory, where the storage term for the long term memory exceeds that of the short term memory.

7. The computer-implemented method of claim 2, further comprising balancing leak rates with activation rates by selectively cooling or heating at least one of the first region and the second region.

8. The computer-implemented method of claim 1, further comprising controlling an effective ratio of activating and inhibiting the synapses using respective weights for the first and second regions.

9. The computer-implemented method of claim 1, further comprising forming a topological mapping of the memory rows to the neurons.

10. The computer-implemented method of claim 9, wherein the topological mapping specifies a set of the neurons that are activated upon reaching a predefined threshold.

11. The computer-implemented method of claim 10, wherein, for each of the memory rows, a sum of activated ones of the given neurons represent a row bit count.

12. The computer-implemented method of claim 9, further comprising selectively customizing the predefined threshold for individual ones of the neurons or groups of the neurons.

13. The computer-implemented method of claim 9, further comprising emulating action potential back-propagation by implicitly refreshing topologically adjacent cells in a row.

14. The computer-implemented method of claim 1, further comprising emulating a loss and relegation of both activating and inhibiting synapses over time using implicit temporal cell voltage leak.

15. The computer-implemented method of claim 1, further comprising:
managing connection between the neurons using a software mapping, where byte addresses of neurons are used as connection reference points; and
responsive to neurons being fired, setting new bits in outbound ones of the neurons.

16. The computer-implemented method of claim 1, further comprising maintaining, in the software mapping, a threshold function parameters for each of the neurons.

17. The computer-implemented method of claim 13, further comprising:
explicitly deactivating built-in refresh circuitry in the DRAM in place of said implicitly refreshing step; and
implicitly refreshing activated ones of the rows by performing a read operation on the activated ones of the rows.

18. A computer program product for neuromorphic computing in a Dynamic Random Access Memory (DRAM), the computer program product comprising a non-transitory computer readable storage medium having program instructions embodied therewith, the program instructions executable by a computer having the DRAM to cause the computer to perform a method comprising:
representing one or more neurons by memory rows in the DRAM, wherein each bit in any of the memory rows represents a single synapse;
dividing the memory rows into a first region and a second region;
evaluating the neurons to determine whether the neurons are activated or inhibited by summation of set ones of the bits in the memory rows to obtain a sum, wherein the bits in the first region provide a positive valued contribution to the sum, and the bits in the second region provide a negative valued contribution to the sum;
responsive to activating a given one of the neurons, reinforcing an associated synaptic state of a corresponding one of the memory rows representing the given one of the neurons; and
responsive to inhibiting the given one of the neurons, degrading the associated synaptic state of the corresponding one of the memory rows representing the given one of the neurons.

19. A computer processing system for neuromorphic computing in a Dynamic Random Access Memory (DRAM), comprising:
a memory for storing program code,
at least one hardware processor for running the program code to
represent one or more neurons by memory rows in the DRAM, wherein each bit in any of the memory rows represents a single synapse;
divide the memory rows into a first region and a second region;
evaluate the neurons to determine whether the neurons are activated or inhibited by summation of set ones of the bits in the memory rows to obtain a sum, wherein the bits in the first region provide a positive valued contribution to the sum, and the bits in the second region provide a negative valued contribution to the sum;
responsive to activating a given one of the neurons, reinforce an associated synaptic state of a corresponding one of the memory rows representing the given one of the neurons; and
responsive to inhibiting the given one of the neurons, degrade the associated synaptic state of the corresponding one of the memory rows representing the given one of the neurons.

\* \* \* \* \*